Feb. 16, 1943.   F. KRUEGER   2,311,115
CAN TESTING MACHINE
Filed July 27, 1939   3 Sheets-Sheet 1

INVENTOR.
FRANK KRUEGER
BY
ATTORNEY.

Feb. 16, 1943.  F. KRUEGER  2,311,115
CAN TESTING MACHINE
Filed July 27, 1939  3 Sheets-Sheet 2

INVENTOR.
FRANK KRUEGER
BY Horace B. Fay
ATTORNEY.

Feb. 16, 1943.  F. KRUEGER  2,311,115
CAN TESTING MACHINE
Filed July 27, 1939  3 Sheets-Sheet 3
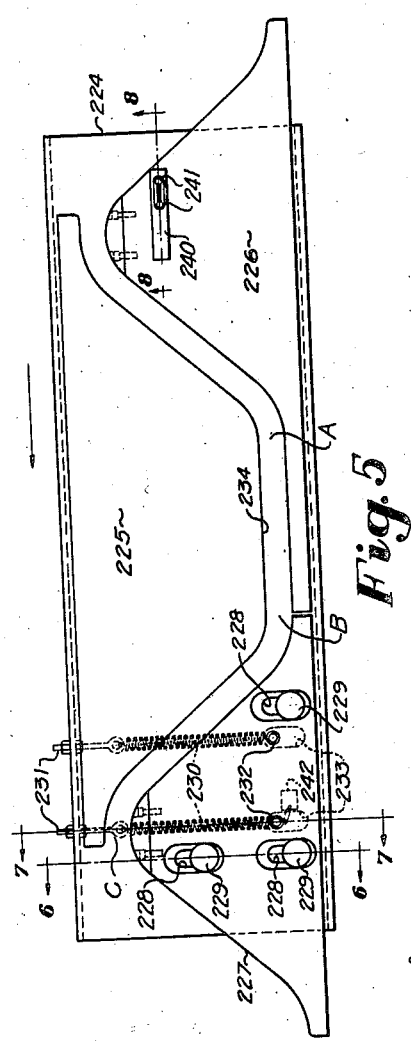
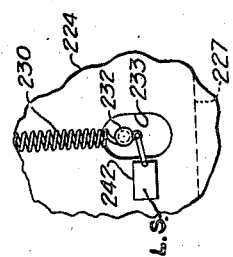
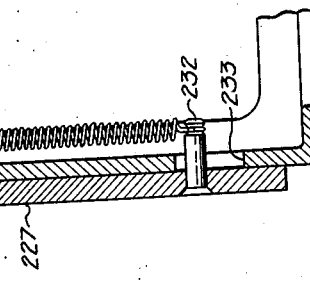
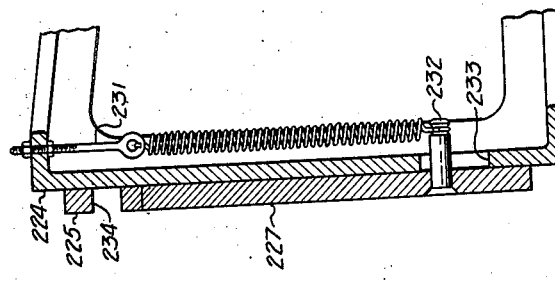
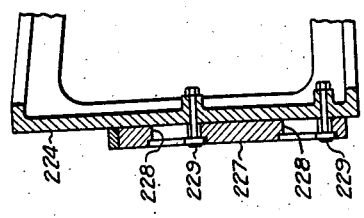
INVENTOR.
FRANK KRUEGER
BY Horace B. Fay
ATTORNEY.

Patented Feb. 16, 1943

2,311,115

UNITED STATES PATENT OFFICE 2,311,115

CAN TESTING MACHINE

Frank Krueger, Brooklyn, N. Y., assignor to E. W. Bliss Company, Brooklyn, N. Y., a corporation of Delaware Application July 27, 1939, Serial No. 286,870

4 Claims. (Cl. 73—51)

This invention relates, as indicated, to a can testing machine, but has reference more particularly to improvements in the can testing machine disclosed in my United States Letters Patent No. 2,112,536, dated March 29, 1938.

In the aforesaid patent, there is disclosed a can testing machine in which the can bodies to be tested are clamped within bucket-like members, between a plunger head and a compressible packing, the bucket-like members being moved to their operative and inoperative positions by hydraulically-operated pistons. With the can bodies thus clamped, air under pressure is introduced into the interior of the can body, and if the can is defective, the air, leaking out of the can, passes through the plunger head and the plunger rod which motivates the head, and thence through ducts which operate a selector mechanism for setting a segregator, as a result of which the defective cans are segregated from the non-defective cans.

Some provision is made in the aforesaid patent for taking care of slight differences in the length of the cans to be tested, no provision is made for handling cans of different diameters, nor is any provision made for effectively locking the can-enclosing bucket in its operative or can-enclosing position during the can-testing period. Moreover, no provision is made for temporarily throwing the tester out of operation in the event that a can is not properly loaded for testing purposes.

It is a primary object of the present invention accordingly to provide in a machine of the character described means for testing cans of varying lengths and diameters, means for effectively locking the can-enclosing buckets in their operative or can-enclosing position during the testing period, and means for temporarily throwing the machine out of operation in the event a can is not properly loaded for testing purposes.

Another object of the invention is to provide means for mechanically instead of hydraulically operating the can-enclosing buckets.

Other objects and advantages of the invention will be apparent during the course of the following description.

In the accompanying drawings, forming a part of this specification:

Fig. 5 is a development of the bucket-operating cam;

Fig. 6 is a cross-sectional view, taken on the line 6—6 of Fig. 5;

Fig. 7 is a cross-sectional view, taken on the line 7—7 of Fig. 5;

Fig. 8 is a fragmentary view, taken on the line 8—8 of Fig. 5; and

Fig. 9 is an enlarged view of a portion of Fig. 5.

Figure 1:
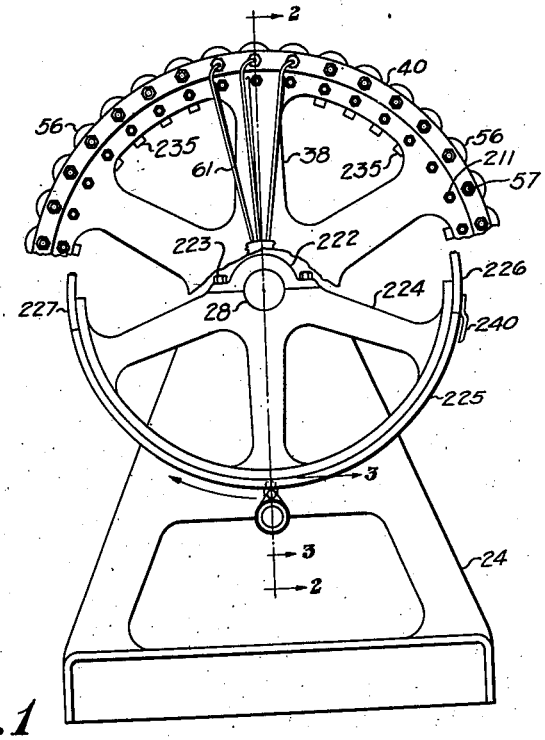
Fig. 1 is an end elevation of a machine embodying my invention, with portions broken away to more clearly show the can-bucket actuating cam.
Figure 2:
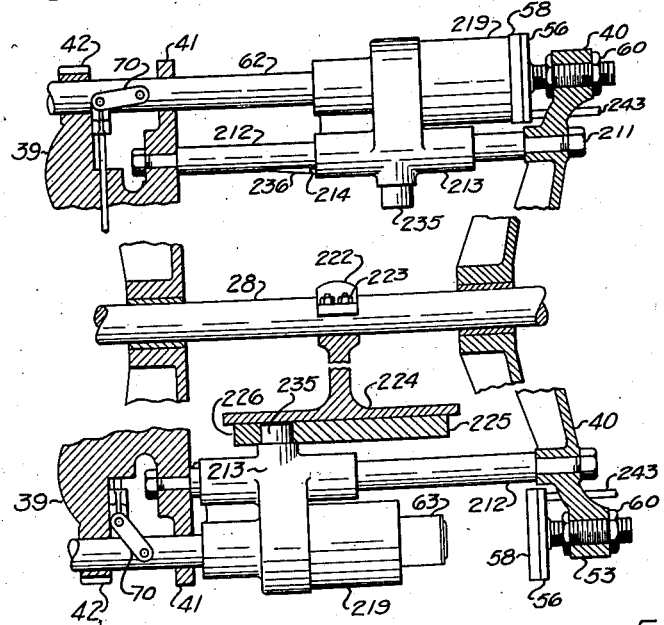
Fig. 2 is a fragmentary view, partly in section, taken on the line 2—2 of Fig. 1.

Referring more particularly to the drawings, there is disclosed a can testing machine comprising a pair of substantially triangular standards 24, Fig. 1, which at their tops are provided with bearings for supporting the tester wheel shaft 28. The shaft 28 is, as described in the aforesaid patent, non-rotatable, the tester wheel 38, which carries the can bodies to be tested, rotating about said shaft. The tester wheel is a composite structure having appreciable thickness in order to provide bearings for the can-receiving, can-holding and can-enclosing mechanism later to be described. The wheel is formed with outwardly directed flanges 39 and 40 at its opposite sides, and intermediate said sides with a third flange 41, on which flanges the above mentioned mechanisms are mounted. The flange 39 is provided with gear teeth 42, whereby the tester wheel may be driven.

The can-receiving, holding and enclosing means as units are circumferentially disposed about the periphery of the testing wheel in equally-spaced relation. One of said units will now be described since all are the same.

Can-holding units

The flange 40 at its outermost periphery is thickened, as indicated at 53, and at circumferentially spaced intervals is provided with openings 54 extending parallel with the wheel axis. Engaging in said openings are can-clamping supports 55 comprising a disk-like head 56 and a screw-threaded shank 57. Carried by the face of the head 56 is a relatively thick, compressible can-clamping packing 58, and extending completely through the packing and can-clamping supports is a duct or charging opening 59. The can-clamping support is adjustable within the thickened portion 53 through the medium of clamping nuts 60. Connected to the outer end of the screw-threaded shank 57 is a hose or pressure conduit 61 through which air under pressure may be charged into a can when clamped against the packing 58.

The flanges 39 and 41 have radially spaced openings 39ª and 41ª respectively therein in axial alignment with the openings 54 in the flange 40, and slidably engaging in said openings are clamp or plunger-rods 62, which at their ends nearest the flange 40, carry a plunger head 63, preferably made of wood or the like. A steel plate 200 is interposed between the plunger rod and the plunger head, and the remote end of the plunger head has secured thereto a plate 201 preferably made of bronze or the like, and having a slotted facing 202 of rubber or the like for engaging the closed end of a can. The head 63, and plates 200 and 201 are removably secured to the plunger rod 62 by means of a screw bolt 203. By substituting for the head 63 other heads which are longer or shorter than said head, cans of widely varying lengths may be tested.

Figure 3:
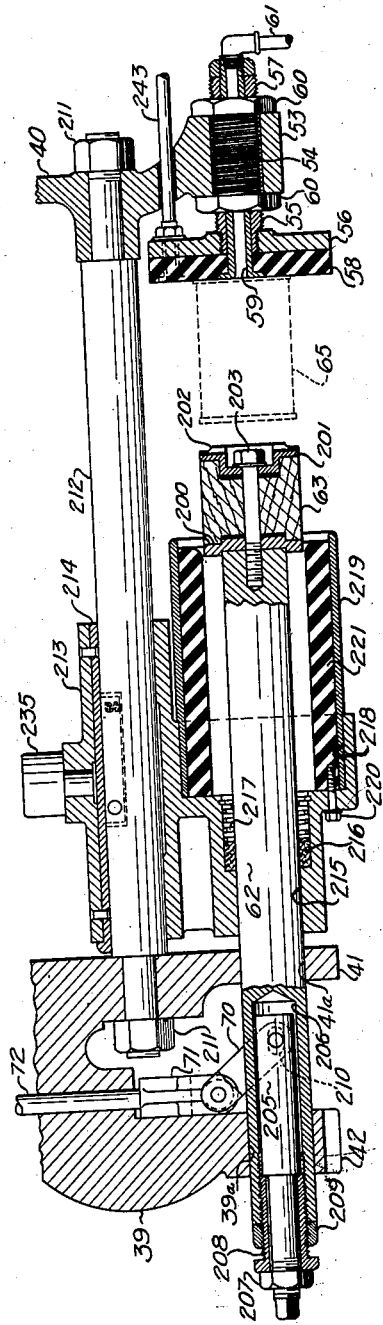
Fig. 3 is a fragmentary cross-sectional view, on an enlarged scale, taken on the line 3—3 of Fig. 1, and showing the can-enclosing bucket in its inoperative or retracted position.
Figure 4:
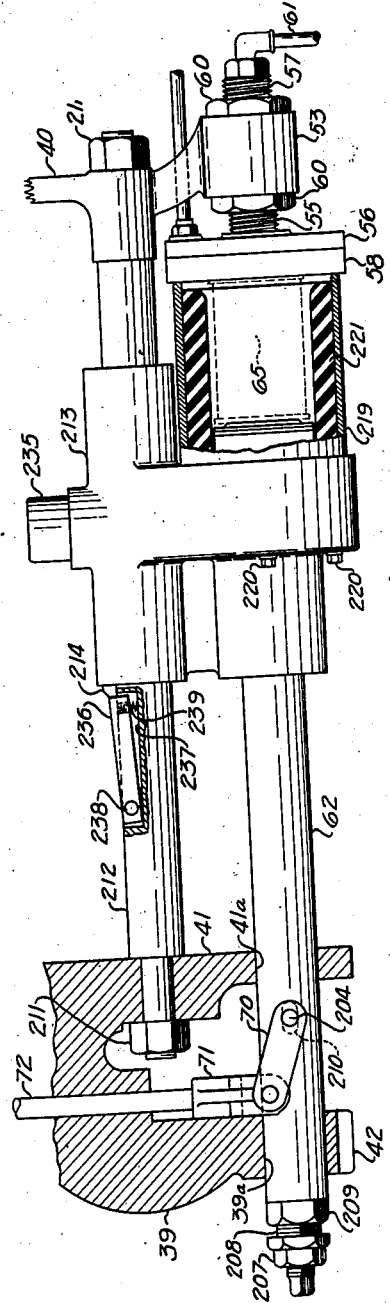
Fig. 4 is a view similar to Fig. 3, but showing the can-enclosing bucket in its operative position.

The plunger rod 62 is adapted to be reciprocated between the position shown in Fig. 3 and the can-clamping position shown in Fig. 4 by the means of mechanism which is described in the aforesaid patent, and which comprises a reciprocable rod 72 having a toggle fork 71 connected thereto, the latter being, in turn, pivotally connected to a pair of toggle links 70. In order to vary the effective stroke of the plunger rod, so as to compensate for slight variations in the lengths of cans which are to be tested, the links 70, instead of being pivotally secured directly to the plunger rod 62, are pivotally secured to the pins 204 of a member 205, which is disposed within a recess 206 in the end of the plunger rod 62. The member 205 may be axially adjusted with respect to the plunger rod, and for this purpose is secured, as by means of a nut 207 to a sleeve 208, which is threadedly secured within and to the plunger rod. The member 205 may be locked in adjusted position by means of a lock-nut 209. In order to permit the aforesaid axial adjustment of the member 205, the openings 210 through which the pins 204 extend, are elongated.

Secured, as by nuts 211, to the tester wheel flanges 41 and 40, radially inwardly of each of the can-clamping supporting means, is a shaft 212, upon which is mounted for reciprocal movement, a can-enclosing bucket supporting casting 213. The casting has secured thereto a wear strip 214. It is also provided with an opening 215 through which the plunger rod 62 extends, a packing 216, held in compressed condition by means of a spring 217 being provided for the purpose of forming an air-tight self-takeup seal between the casting 213 and the plunger rod. The casting 213 is recessed as at 218 for the reception of a metallic cylindrical can-enclosing bucket 219. Removably carried by the casting and with the bucket by bolts 220 is a liner or adapter 221 which is cylindrical in form to conform to the bucket and on its interior is shaped to closely approximate the contour of a can being tested. The liner is made of a homogeneous air-tight material, such as "Bakelite" or hard rubber. The inner diameter of the liner 221 is but slightly larger than the diameter of the head 63, so that when the casting 213 is moved to the position shown in Fig. 4, the liner 221 moves freely over the head 63. By substituting for the head 63 heads of larger or smaller diameter, and substituting for the adapter 221 adapters of corresponding larger or smaller internal diameter, provision may be made for testing cans of widely varying diameters.

The movements of the bucket-link member 219 through the reciprocation of the casting 213 will now be explained.

*Mechanical operating bucket*

Rigidly clamped to the shaft 28 of the tester wheel, as by means of a cap 222 and screw-bolts 223, is a cam spider 224, to the periphery of which is secured a cam, the development of which appears in Fig. 5.

The cam comprises stationary portions 225 and 226, and a portion 227, which is slidable laterally with respect to the portion 225, the portion 227 for this purpose having a plurality of elongated slots 228 therein, into which pins 229 extend, these pins being secured to the cam spider 224 and limiting the lateral movement of said portion of the cam. The lateral movement of the cam portion 227 is opposed by coil springs 230, which are secured at one end to eyebolts 231 adjustably secured to the cam spider 224, and at the other end to pins 232 which extend from the cam portion 227 through elongated slots 233 in the cam spider. The springs 230 serve normally to maintain the cam portion 227 in its operative position, as shown in Fig. 5. The cam portions 225, 226 and 227 cooperate to provide a cam groove 234 in which a cam roller 235 extending from the casting 213 is adapted to move, as will be presently described.

For the purpose of preventing retrogression of the casting 213 during the can testing operation, a detent 236 is provided, which, as shown in Fig. 4, lies in a recess 237 in the shaft 212, being pivoted to the shaft, as at 238. The detent is normally held in operative position by means of a coil spring 239.

Means are also provided for depressing the detent 236 at the beginning of the can unloading operation, so as to permit retraction of the casting 213. Such means comprises a depressor blade 240, which is secured to the cam portion 226, as by means of screws 241.

Means are also provided for automatically throwing the machine out of operation when a can to be tested is imperfectly located. Such means, which are best seen in Fig. 9, comprise a limit switch 242 which is so mounted as to open or close a circuit controlling the rotation of the tester wheel. Connected to said switch 242 is a control member 244 that, at its other end, engages pin 232, to which spring 230 is attached as described above. When pressure is exerted by the spring on pin 232 in case of a cocked can traveling within groove 234 and reaching point C, this pressure will be transmitted to member 244, which will cause limit switch 242 to open and break the circuit controlling the rotation of the tester wheel.

Air which leaks through defective cans is conducted to the segregator mechanism described in the aforesaid patent by means of a conduit 243, which, it will be noted, is connected directly to the head 56 of the can-clamping support 55. This is advantageous in that it renders unnecessary the perforating of the plunger 62 or the attachment of air-conduction conduits to the latter, as described in my aforesaid patent.

The operation of the machine, insofar as the improvements which have been described are concerned, will now be briefly described.

Operation

It will be noted that the can tester wheel is moving in the direction indicated by the arrow in Fig. 1, this direction of movement of said wheel relatively to the cam being also indicated by the arrow in Fig. 5.

It will also be assumed that a casting 213 is in the position shown in Fig. 4, which may be briefly described as the can-testing position, and that such casting is approaching the cam from the right side as viewed in Fig. 5. While in the can-testing position, the can 65 is clamped to the packing 58 by the head of the plunger 63, and is completely enclosed by the adapter 221 of the bucket 219, the bucket bearing against the packing 58 to form an air-tight testing chamber. Air, under pressure, is admitted into the can through the duct 59, and if the can is not air-tight, such air will enter the space between the exterior of the can and the adapter 221, and be expelled through the conduit 243, eventually finding its way to Sylphons which operate selector mechanism for setting a defective can segregator, as clearly described in my aforesaid patent.

After the can has been thus tested, the roller 235 on the casting 213 enters the cam groove 234, and at the same time, the detent 236 is depressed by the depressor blade 240 until the outer surface of such detent is substantially flush with the surface of the shaft 212, permitting the casting 213 to be moved along the shaft by the cam. The casting 213 is moved by the cam to the position shown in Fig. 3, the plunger head 63 being simultaneously retracted to the position shown in this figure, whereupon the tested can is unloaded, as described in my aforesaid patent. The unloading of the can occurs approximately when the cam roller 235 occupies the point A in the cam groove 234.

The loading of another can for testing is initiated when the cam roller 235 occupies the point B in the cam groove 234, and is completed when the cam roller reaches the point C in the cam groove.

In the event that a can becomes slightly cocked in the air-testing chamber, i. e. the bucket 219, the cam roller 235 will encounter resistance in its movement to the point C, with the result that the cam portion 227 will be moved laterally relatively to the cam portion 225, thereby causing the pin 232 to actuate the limit switch 242, stopping the movement of the tester wheel, until such time that the improperly loaded can can be properly loaded and operation of the tester wheel resumed.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a machine of the character described, a tester wheel, a can clamping member on said tester wheel, a can enclosing bucket movable into and out of engagement with said member and cam means for mechanically actuating said bucket, said cam means comprising stationary parts and a yielding portion, said portion being adapted to be moved upon failure of said bucket properly to engage said can clamping member, and mechanism associated with said yieldable cam portion and actuated by the movement thereof for stopping said tester wheel.

2. In a machine of the character described, a tester wheel, a can clamping member on said tester wheel, a can enclosing bucket movable into and out of engagement with said can clamping member, a sliding carriage for said bucket, a cam and cam follower for mechanically actuating said carriage, said cam comprising stationary parts and a yieldable portion, said portion being adapted to be moved by said cam follower upon failure of said bucket properly to engage said can clamping member, and mechanism associated with said yieldable cam portion and actuated by the movement thereof for operating an electric switch to stop said tester wheel.

3. In a machine of the character described, a tester wheel, a can clamping member on said tester wheel, a can enclosing bucket movable into and out of engagement with said can clamping member, a sliding casting for carrying said bucket, and a cam and cam follower for mechanically actuating said casting, said cam means comprising stationary parts and a yieldable portion, said cam follower being mounted on said casting and adapted laterally to move said yieldable portion upon failure of said bucket properly to engage said can clamping member, spring means normally to hold said yieldable cam portion in place and an electric switch actuated by the movement of said spring means to stop said tester wheel.

4. In a machine of the character described, a tester wheel, a can clamping member on said tester wheel, a can enclosing bucket movable into and out of engagement with said can clamping member, a sliding casting for carrying said bucket, and a cam and cam follower for mechanically actuating said casting, said cam means comprising stationary parts and a yieldable portion, said cam follower being mounted on said casting and adapted laterally to move said yieldable portion upon failure of a can to be properly accommodated for testing in said bucket, a spring normally to hold said yieldable cam portion in place and an electric switch actuated by the compression of said spring to break a circuit and thereby to stop said tester wheel.

FRANK KRUEGER.